United States Patent Office 3,114,708
Patented Dec. 17, 1963

3,114,708
DRY POLYOLEFIN/OIL BLENDS
Arnold J. Morway, Clark, and George M. Coats, Berkeley Heights, N.J., assignors to Esso Research and Engineering Company, a corporation of Delaware
No Drawing. Filed Dec. 29, 1960, Ser. No. 79,160
8 Claims. (Cl. 252—12)

This invention relates to dry blends made from polyolefins and oil, such blends being useful as lubricants and lubricant thickeners. In particular the invention relates to a method of preparing such blends, their use as thickener concentrates to prepare finished lubricants, and their use as lubricants per se.

It had been known in the art that various polymers could be blended with oils to produce lubricants ranging from solid greases to low viscosity fluids. It has now been found that by blending the polymers of $C_2$ and $C_3$ olefins with up to 75 wt. percent of an oil or grease at elevated temperatures, the resulting blend when allowed to cool is a dry solid. It was expected that such a large proportion of oil would result in a product that would ooze oil or would have a slippery, greasy feel or appearance. Surprisingly, the blend of polyolefin with oil is a dry, solid substance which may be powdered, pelletized, sliced or subjected to any physical treatment common to solid plastics.

This unique blend has wide applicability in areas such as high temperature-pressure metal extrusion lubricant formulation, mold release formulations for die casting, in powder form as a substitute for or mixed with graphite or $MoS_2$, as a gear lubricant, and to satisfy other lubrication requirements where a solid lubricant of this nature would be advantageous. An additional advantage of the blend is that off-specification polyolefins from regular manufacturing processes can be used, thus advantageously utilizing a waste product.

A major feature of this invention is the discovery that these blends can be easily dispersed in lubricating oil and greases in small quantities to produce excellent finished lubricating greases. The dry blend also offers an easily marketable concentrate. Furthermore, polyolefins of the type of this invention are normally difficult to disperse in lubricating oil. For instance, it generally requires at least 0.5 hour of constant stirring at a temperature of at least 325° F. to disperse as small an amount of 3 wt. percent of a propylene polymer in oil. In contrast, a grease prepared from the dry blend of the invention containing the same percent of polypropylene can be prepared from the blend by dispersing the blend in oil by heating to only 275° F. for 5 minutes with moderate mixing. Although, in some instances, a temperature as high as 400° F. and a time as long as 30 minutes is desirable.

The dry blends of the invention are conveniently prepared by mixing the polyolefin and oil or grease in a suitable mixing apparatus until all the oil and/or grease has been taken up or until the polyolefin is unable to take up any more oil or grease. It is preferred that the polymer by brought up to the mixing temperature prior to the addition of any oil or grease. In general, the mixing temperature will range from about 275 to 400° F., preferably at least 300 to 350° F. The mixing time will be from about 5 minutes to 30 minutes depending upon temperature, severity of the mixing, and the proportions of the components mixed.

The polyolefin will preferably take up from about 40 to 60 wt. percent oil based on the total of dry blend. It is usually desirable to incorporate as much oil or grease in the polyolefin as possible; however, for some applications as small a quantity as 20 wt. percent of oil or its equivalent may be incorporated in the polyolefin.

The polymer will generally take up from 20 to 75 wt. percent, e.g., 50 to 60 wt. percent of a grease.

Suitable mixing apparatus includes conventional type two-roll hot mills, calendering apparatus such as the Banbury mixer, extrusion mixers, ribbon blenders, intensive internal mixers and other apparatus known to the art capable of imparting an intimate kneading, mixing motion to the polyolefin and oil/grease blend.

The polyolefin/oil or grease blend is of a puttylike consistency at its temperature of formation and may be molded or extruded into any desired shape before cooling. After being allowed to cool to ambient temperature it becomes a hard, dry solid substance. The polyolefin employed in this invention is preferably prepared by polymerizing propylene or ethylene in the presence of a catalyst obtained by mixing a compound having reducing properties with a reducible metal compound. Such polyolefins having an average molecular weight in the range of about 10,000 to about 1,000,000, preferably about 30,000 to 500,000, and more preferably about 30,000 250,000, can be used to prepare the dry blends of the invention. The molecular weights referred to in the specification are those obtained by determining the intrinsic viscosity and converting this to molecular weight using the correlation of Harris (J. Pol. Sci. 8, 361 (1952)).

Not only is the polymer/oil or grease blend suitable for preparing greases from lubricating oils but it may also be dispersed in other greases. For instance, it is known that greases made from oil dispersed high molecular weight polymers of ethylene and propylene catalyzed by a catalyst mixture of a reducing compound and a reducible metal compound exhibit several unique properties. They have high dropping points (i.e., above 200° F.), excellent adhesiveness and stringiness. These characteristics enable greases prepared from this type of polyolefin polymer to withstand splatter under impact loads, withstand shear breakdown, and adhere to the surfaces to be lubricated. Thus, a polypropylene or polyethylene oil or grease blend may be added to other greases which lack the particular advantageous properties of polypropylene or polyethylene thickened greases in order to obtain novel greases exhibiting not only the inherent properties of the original grease but also the properties described for the polyolefin thickened greases.

It is known that polymers of ethylene and propylene prepared using the described catalyst system are mixtures of oil-soluble atactic, and oil-insoluble isotactic polymers. The oil-soluble polymers have molecular weights in the region of about 1,000 to 20,000 and the oil-insoluble polymers, molecular weights of 20,000 to about 1,000,000. The oil-soluble polymers tend to give stringiness characteristics to a grease and the oil-insoluble polymers tend to give adhesiveness characteristics to a grease. When a mixture of oil-insoluble and oil-soluble polymers is used in a grease the grease will tend to have both properties in proportion to the amount of each present in the composition.

For purposes of this invention, the more oil-insoluble the polymer is, the more oil it will take up in forming the dry solid blends. Polymers which are completely oil-soluble do not make satisfactory dry solid blends. However, a mixture of oil-soluble and oil-insoluble polymers having an average molecular weight as low as 10,000 will make satisfactory dry blends when the amount of oil to be blended in is reduced approximately by the amount of oil-soluble polymer present in the mixture. The polymers produced by the particular catalyst system of this invention are mixtures having major portions of the oil-insoluble polymer present. If desired the oil-insoluble polymer can be separated from the oil-soluble to make dry, solid blends having a relatively large quantity of oil incorporated therein.

Thus, in practicing the invention it is possible to blend a polymer with up to 75 wt. percent of either an oil or a grease. The resultant dry, solid blend can then be used to form lubricating compositions from oil or other greases. And, of course, the blend itself may be used as a lubricant for those applications where a solid, dry lubricant is called for.

These polyolefins can be conveniently prepared by polymerizing the ethylene or propylene in the presence of a catalyst obtained by mixing a reducing metal compounded with a reducible metal compound. More particularly, the reducing compound is preferably a compound of aluminum having the following general formula:

where R and R' are members selected from the group consisting of hydrogen, alkyl radicals and aryl radicals and X is a member selected from the group consisting of hydrogen, halogen atoms, alkoxy radicals, aryloxy radicals, secondary amino radicals, secondary acid amide radicals, mercapto radicals, thiophenol radicals, radicals of carboxylic acids and radicals of sulfonic acids. Specific examples of such aluminum compounds include aluminum triethyl, aluminum trimethyl, aluminum triisopropyl, aluminum diethyl bromide, aluminum diethyl chloride, aluminum diphenyl bromide, aluminum diphenyl chloride, aluminum triphenyl, aluminum hydride, ethyl aluminum dihydride, diethyl aluminum hydride and ethyoxy aluminum diethyl. The preferred aluminum compounds are (1) dialkyl aluminum monohalides containing about 2 to 4 carbon atoms in the alkyl groups and chlorine or bromine atoms, particularly chlorine atoms, and (2) aluminum trialkyls containing about 2 to 4 carbon atoms in the alkyl groups.

The reducible metal compound is one of a metal of groups IV–B, V–B, VI–B and VIII of the periodic system of elements. Examples of such elements include titanium, zirconium, hafnium, thorium, uranium, vanadium, columbium, tantalum, chromium, molybdenum and tungsten. Examples of the compounds of these metals which may be used include halides such as chlorides or bromides, oxy halides such as oxychlorides, complex halides such as complex fluorides, freshly precipitated oxides or hydroxides, organic compounds such as alcoholates, acetates, benzoates or acetyl acetonates. The preferred salts are those of titanium, zirconium, thorium, uranium and thromium. Titanium salts are particularly preferred such as titanium tetrachloride, titanium oxychloride or titanium acetyl acetonate.

The catalyst mixture is prepared simply by mixing the metal compound having reducing properties with the reducible heavy metal compound (either before, during, or after the addition of the polymerizable olefin). The two ingredients are intimately mixed in the presence of an inert liquid diluent. Hydrocarbon diluents are particularly preferred, especially saturated aliphatic hydrocarbons containing about 5 to 15 carbon atoms, e.g., hexane and heptane. Aromatic hydrocarbons such as benzene, toluene and xylene may also be used. Such diluents are also useful in the polymerization reaction itself. In general, at least one mole of the metal compound having reducing properties will be mixed with a mole of the reducible metal compound. Preferably the molar ratio of the reducing metal compound to the reducible metal compound is in the range of about 1.5:1 to 6:1. The catalyst mixture is prepared preferably using an inert liquid diluent in an amount sufficient to form a mixture containing about 0.2 to 25.0 weight percent of the catalyst components, and employing mixing temperatures in the range of about −20 to 150° F. and mixing times of about 5 minutes to 24 hours.

The preferred catalyst mixtures employed for polymerizing propylene or ethylene to prepare the polyolefins useful in this invention are (1) catalysts obtained by mixing dialkyl aluminum monohalides with titanium tetrachloride, (2) catalysts obtained by mixing aluminum trialkyls with titanium tetrachloride, and (3) mixtures of dialkyl aluminum mono halides and aluminum trialkyls with titanium tetrachloride. Preferably the alkyl groups in the aluminum compounds contain in the range of 2 to 4 carbon atoms and the halides are those of chlorine and bromine. Aluminum compounds containing ethyl or isobutyl groups as the alkyl groups are particularly preferred.

It is desirable to carry out the polymerization of ethylene or propylene with the above-described catalysts using an inert liquid diluent. The amount of the inert liquid diluent employed in the polymerization process should be such that the final polymeric product in the reaction mixture does not exceed about 40 wt. percent so that a relatively fluid reaction mixture is produced. Preferably the amount of inert diluent is such that the polymeric product in the final reaction mixture is in the range of about 1% to 25% by weight. The proportion of catalyst based on the inert liquid diluent will generally be in the range of about 0.05 to 0.5 wt. percent, preferably about 0.1 to 0.3 wt. percent. Prior to the polymerization reaction, it is preferred to purify the propylene or ethylene of undesirable poisons such as oxygen, carbon monoxide, water, acetylene, etc. by passing the propylene or ethylene through an aluminum alkyl solution and/or appropriate adsorbents, e.g., silica gel, alumina.

The polymerization reaction is carried out generally at a temperature in the range of about 104° to 248° F., preferably about 122° to 176° F. Reduced pressures, atmospheric pressure or elevated pressures may be employed in the polymerization reaction. For example, pressures as high as 2,000 p.s.i.g. or higher may be employed. Generally polymerization times of about 0.1 to 100 hours, preferably about 0.5 to 10 hours, will be employed. If the polymerization reaction is carried out at substantially atmospheric pressure, it is particularly preferred to employ a catalyst obtained by mixing aluminum trialkyls with titanium tetrachloride wherein the molar ratio of aluminum to titanium is about 2:1. When employing elevated pressures, that is, pressures greater than about 100 p.s.i.g., it is preferred to employ a catalyst obtained by mixing aluminum trialkyl, aluminum dialkyl monohalide and titanium tetrachloride. The molar ratio of the aluminum trialkyl to aluminum dialkyl monohalide should be maintained generally in the range of about 1:19 to 19:1, preferably about 1:4 to 4:1. Molar ratios of aluminum to titanium of 1.5:1 to 6:1 are preferred. These particular polymerization reaction conditions are preferred since they give a high catalyst efficiency, i.e., grams of polymer per gram of catalyst.

On completion of the polymerization reaction, the reaction mixture can be quenched by the addition thereto of an alcohol, such as isopropyl alcohol, butyl alcohol, etc. This quenching agent deactivates the catalyst. The polymer obtained in this reaction is predominantly the isotactic type with small quantities of the atactic type also present. Pure isotactic polymer may be obtained by conventional means such as solvent extraction.

The lubricating oil base stocks used to prepare the polymer/oil blend of the invention and also as the oil base to which the dry blend may be added can be straight mineral lubricating oils or distillates derived from paraffinic, naphthenic, asphaltic, or mixed base crudes or, if desired, various blended oils can be employed as well as residuals, particularly those from which asphaltic constituents have been carefully removed. The oils can be refined by conventional methods using acid, alkali and/or clay or other agents such as aluminum chloride, or they may be extracted oils produced, for example, by solvent extraction with solvents of the type of phenol, sulfur dioxide, furfural, dichlorodiethyl ether, nitrobenzene, crotonaldehyde, etc. Hydrogenated oils, white oils, or shale oil can be employed as well as synthetic oils, such as those prepared, for example, by the polymerization of olefins or by the reaction of oxides of carbon with hydrogen or by the hydrogenation of coal or its products. Also, for special applications, animal, vegetable or fish oils, or their hydrogenated or voltolized products can be employed alone or in admixture with mineral oils.

Synthetic lubricating oils which may be used include esters of monobasic acids (e.g. $C_8$ Oxo alcohol ester of $C_8$ Oxo acid); esters of dibasic acids (e.g. di-2-ethyl hexyl sebacate); esters of glycols (e.g. $C_{13}$ Oxo acid diester of tetraethylene glycol); complex esters (e.g. the complex ester formed by reacting one mole of sebacic acid with two moles of tetraethylene glycol and two moles of 2-ethyl hexanoic acid); esters of phosphoric acid (e.g. the ester formed by contacting three moles of the monomethyl ether of ethylene glycol with one mole of phosphorous oxychloride); halocarbon oils (the polymer of chlorotrifluorethylene containing twelve recurring units of chlorotrifluoroethylene); alkyl silicates (methyl polysiloxanes); mercaptals (e.g. the mercaptal formed by reacting 2-ethyl hexyl mercaptan with formaldehyde); formals (e.g. the formal formed by reacting $C_{13}$ Oxo alcohol with formaldehyde); polyglycol type synthetic oils (e.g. the compounds formed by condensing butyl alcohol with 14 units of propylene oxide, etc.); etc., or mixtures of any of the above in any proportions. Quite generally the mineral or synthetic oils used in the invention will have a viscosity of from 30 to 600 SUS at 210° F.

Any of the common greases may be incorporated in the polymer to form the dry blend. The same greases may be used as the base in which the dry blend is incorporated. Included are greases wherein lubricating oil is thickened with salts, soaps, soap-salt or mixed salt complexes, polymeric thickeners (e.g. polymers of $C_2$ to $C_4$ monoolefins of 10,000 to 200,000 molecular weight such as polyethylene), and inorganic thickeners (e.g. clay, carbon black, silica gel, etc.).

Generally, the greases will comprise either a synthetic or mineral lubricating oil thickened with about 3 to 35 wt. percent, usually 3 to 20 wt. percent, of a thickener. In the case of soap-salt and mixed-salt thickeners, the thickener is usually formed by co-neutralization in oil, by metal base, of various mixtures of high molecular weight fatty acids and/or intemediate molecular weight fatty acids with low molecular weight fatty acids.

The high molecular weight fatty acids useful for forming soap, soap-salt and mixed-salt thickeners include naturally occurring or synthetic, substituted and unsubstituted, saturated and unsaturated, mixed or unmixed fatty acids having about 14 to 30, e.g. 16 to 22, carbon atoms per molecule. Examples of such acids include stearic, hydroxy stearic, such as 12-hydroxy stearic, dihydroxy stearic, poly-hydroxy stearic and other saturated hydroxy fatty acids, arachidic, oleic ricinoleic, hydrogenated fish oil, tallow acids, etc.

Intermediate molecular weight fatty acids include those aliphatic, saturated, unsubstituted, monocarboxylic acids containing 7 to 12 carbon atoms per molecule, e.g., capric, lauric, caprylic, nonanoic acid, etc.

Suitable low molecular weight acids include $C_2$ to $C_4$ fatty acids. Acetic acid or its anhydride is preferred.

Metal bases which are frequently used to neutralize the above acids are the hydroxides, oxides or carbonates of alkali metals (e.g. lithium and sodium) or of alkaline earth metals (e.g. calcium, magnesium, strontium and barium).

Various other additives may also be added to the lubricating compositions made from the dry blend (e.g. 0.1 to 10.0 weight percent based on the total weight of the composition), e.g. oxidation inhibitors such as phenyl-alpha-naphthylamine; tackiness agents such as polyisobutylene; stabilizers such as aluminum hydroxy stearate; corrosion inhibitors, such as sorbitan monooleate, and the like.

This invention may be illustrated by the following examples.

EXAMPLE I.—PREPARATION OF A POLYMER/OIL BLEND

A polymer/oil blend was prepared by placing 200 grams of an isotactic polypropylene polymer having a molecular weight of about 100,000 in a two-roll hot mill, heating the polymer in the mill until a temperature of about 350° F. was reached. At that point 183 gms. of a phenol extracted paraffinic neutral oil with a viscosity index of from 100 to 105 and a viscosity of 250 SUS at 210° F. was added and the mixture mixed for about 10 minutes at about 350° F. At the end of this time all the oil had been taken up by the polymer. The polymer/oil blend was removed from the mixer and allowed to cool to ambient temperature. The resulting blend was a dry solid, slightly yellowed substance.

EXAMPLE II.—PREPARATION OF A GREASE FROM THE BLEND OF EXAMPLE I

*Formulation*

6.0% of polypropylene/oil blend of Example I
93.5% solvent refined neutral mineral oil, with a viscosity of 450 SUS at 210° F.
0.5% phenyl α-naphthylamine A finished lubricating grease was prepared by charging the polymer/oil blend of Example I and the mineral oil to a steam heated kettle equipped with mixing means and heating to 290–325° F. while mixing. The time needed to reach 325° F. and disperse the blend was 5 minutes. When the blend is completely dispersed, the batch is allowed to cool to 200° F. while mixing and then allowed to cool quiescently at about 2–3° F./minute. When the batch reached ambient temperature it was homogenized in a Gaulin homogenizer. Several tests were performed on the finished grease, the results of which are summarized in the following table.

*Properties*

Appearance—excellent, smooth grease,
Dropping point _____°F__ 320
Penetrations, 77° F.:
    Unworked _____ 325
    Worked, 60 strokes _____ 340
    Worked, 10,000 strokes _____ 345
Lubrication life, hours (250/ F. 1000 r.p.m., 204
    ball bearing) _____ 1575

Thus, it is seen that a dry blend of polymer and oil can be prepared which can be used to prepare greases having excellent properties.

In order to further illustrate the invention other dry blends and lubricating compositions may be prepared as set forth in the following examples.

EXAMPLE III.—PREPARATION OF A POLYMER/GREASE

*Blend*

A dry solid polypropylene blend is prepared by a procedure exactly similar to Example I except that a grease is used in place of the lubricating oil. The grease has the following formulation in weight percents:

11.0% glacial acetic acid
3.7% Wecoline acids AAC (low mol. wt. coconut fatty acids)
1.8% hydrolfol acids Code 200 (12-hydroxy stearic acid)
7.8% hydrated lime
0.3% phenyl-α-naphthylamine
75.4% mineral lubricating oil (55 SUS at 210° F.)

The lime, mineral oil and hydrofol acids (Code 200) are added to a steam heated kettle and intimately mixed. A blend of the acetic and Wecoline AAC acids (a mixture of 28 wt. percent caprylic, 46 wt. percent capric and 26 wt. percent lauric acids derived from low molecular weight coconut fatty acids) is then slowly added to the kettle while stirring. The mixture is dehydrated by heating to 325° F. while stirring. Next, the product is cooled to 200° F. by passing cool water through the kettle jacket. Phenyl-α-naphthylamine is added as an oxidation inhibitor and the batch is further allowed to cool to ambient temperature and then is homogenized in a Moorehouse mill having a clearance of 0.003 inch.

EXAMPLE IV.—PREPARATION OF A GREASE FROM A POLYMER/GREASE BLEND

*Formulation*

6.0% polypropylene/grease blend of Example III
93.5% solvent refined neutral mineral oil with a viscosity of 450 SUS at 210° F.
0.5% phenyl α-naphthylamine Example II is repeated exactly except the polymer/grease blend of Example III is used in place of the polymer/oil blend of Example I.

EXAMPLE V.—ADDITION OF POLYMER/OIL BLEND TO A GREASE

Example II is repeated exactly except that the mineral oil is replaced with the grease of Example III. Thus, it is apparent that various types of lubricating greases can be prepared according to the invention.

EXAMPLE VI.—PREPARATION OF A GREASE FROM THE POLYMER/OIL BLEND AND A GREASE 6.0% polypropylene/oil blend of Example I
47.0% hydrofined naphthenic coastal oil with a viscosity of 55 SUS at 210° F.
47.0% commercial grease having 18 wt. percent of a calcium salt-soap complex dispersed in 82 wt. percent of a hydrofined distillate oil having a viscosity of 500 SUS at 100° F. which was obtained from a low cold test Gulf coastal virgin crude.

The polymer/oil blend, oil and grease were heated while mixing to about 325° F. for 10 minutes and then cooled to 110° F. and milled in a Moorehouse mill.

The commercial grease had the following properties:

Appearance—excellent, smooth grease.
Dropping point _____ 500+.
Penetration at 77° F.:
    Unworked _____ 310.
    Worked, 60 strokes _____ 325.
    Worked, 10,000 strokes _____ 339.
Almen extreme:
    Pressure test _____ 15 weights carried.
    Pin condition _____ Like original.

The new grease formulated from the blend of Example I has the following properties:

Appearance—excellent, smooth grease.
Dropping point _____ 500+.
Penetration:
    Unworked _____ 310.
    Worked 60 strokes _____ 325.
    Worked 10,000 strokes _____ 339.
Almen extreme:
    Pressure test _____ 15 weights carried.
    Pin condition _____ Like original.

Thus it is seen that by adding the polypropylene/oil blend of Example I to a commercial grease formulation diluted by half, the properties of the commercial grease are substantially retained while the amount of original thickener is reduced by one half.

EXAMPLE VII

To further illustrate the invention the blend of Example I is pulverized to an average particle size of 50 microns. 2 wt. percent of the pulverized blend is mixed with glycerine. The glycerine and blend mixture is then applied to the inside of a die casting mold where it facilitates ease of removal of the casting.

EXAMPLE VIII

The polymer/oil blend of Example I was pulverized to a powder and this product was employed as a dry lubricant between operating gears. The product tended to flake out on the gears and act as a dry lubricant preventing noisy gear operation and wear on the gear teeth.

*Gear Lubricant*

| Lubricant | Lubrication | | |
|---|---|---|---|
| | Noise | Lubrication | Wear on Gears |
| None | Noisy | | High. |
| Bright Stock (having viscosity of 1,700 SUS at 210° F.) | Less Noise | Fair | Moderate. |
| Polymer/oil blend of Example I (pulverized) | Quiet | Excellent | Low. |

EXAMPLE IX

The procedure of Example I is repeated exactly except that isotactic polyethylene having a molecular weight of 200,000 is used in place of the polypropylene and the mineral oil of Example II is used in place of the mineral oil of Example I.

EXAMPLE X

The procedure of Example II is repeated exactly except that the polyethylene/oil blend of Example IX is used in place of the polypropylene/oil blend of Example I and the mineral oil is a mineral oil having a viscosity of 55 SUS at 100° F. obtained from a coastal crude.

What is claimed is:

1. A dry solid blend of lubricating grease in polymer which comprises:
   (a) from 80 to 25 wt. percent of $C_2$ to $C_3$ olefin polymer having an average molecular weight of from 10,000 to 1,000,000, said polymer comprising a major portion of isotactic polymer, and
   (b) from 20 to 75 wt. percent of a lubricating grease.

2. A dry solid blend of lubricant in polymer which comprises:
   (a) from 60 to 40 wt. percent of $C_2$ to $C_3$ olefin polymer having an average molecular weight of from 30,000 to 500,000, said polymer comprising a major portion of isotactic polymer, and
   (b) from 40 to 60 wt. percent of a lubricant selected from the group consisting of lubricating oils and greases.

3. A dry solid blend as defined in claim 2 wherein said lubricant is a synthetic lubricating oil and wherein said olefin polymer is polypropylene.

4. In a system for lubricating moving parts wherein said parts have relative motion and wherein a lubricant is contacted with said parts, the improvement which comprises using as said lubricant the dry solid blend of claim 1.

5. A method for preparing a lubricating composition which comprises dispersing the dry solid of claim 2 in a lubricant selected from the group consisting of lubricating oils and greases.

6. A method for preparing a dry solid blend of lubricating grease in polymer which comprises:
   (a) heating from 80 to 25 wt. percent of $C_2$ to $C_3$ olefin polymer having an average molecular weight of from 10,000 to 1,000,000, said olefin polymer comprising a major portion of isotactic polymer,
   (b) blending into said polymer from 20 to 75 wt. percent of a lubricating grease, and
   (c) recovering said dry solid.

7. A method for preparing a dry solid blend of lubricant in polymer which comprises:
 (a) heating from 60 to 40 wt. percent of $C_2$ to $C_3$ olefin polymer having an average molecular weight of from 30,000 to 500,000, said olefin polymer comprising a major portion of isotactic polymer,
 (b) blending into said polymer from 40 to 60 wt. percent of a lubricant selected from the group consisting of lubricating oils and greases, said blending being accomplished at a temperature of from about 275 to 400° F., and
 (c) recovering said dry solid.

8. A method as defined in claim 7 wherein said lubricant is a mineral lubricating oil and wherein said olefin polymer is polyethylene.

References Cited in the file of this patent

FOREIGN PATENTS

| | | |
|---|---|---|
| 1,161,281 | France | Mar. 17, 1958 |
| 1,054,632 | Germany | Apr. 9, 1959 |